United States Patent
Leard et al.

[11] Patent Number: 6,118,385
[45] Date of Patent: Sep. 12, 2000

[54] METHODS AND APPARATUS FOR AN IMPROVED CONTROL PARAMETER VALUE INDICATOR

[75] Inventors: Thomas M. Leard, Carefree; John P. Gilmore, Glendale, both of Ariz.

[73] Assignee: Honeywell Inc., Minneapolis, Minn.

[21] Appl. No.: 09/150,121

[22] Filed: Sep. 9, 1998

[51] Int. Cl.[7] .................................................. G08B 21/00
[52] U.S. Cl. ........................ 340/688; 340/945; 340/963; 340/971; 340/461; 340/462; 340/441; 701/14
[58] Field of Search ..................... 340/973, 974, 340/461, 525, 975, 961, 441, 815.78, 963, 688, 964, 971, 445, 462; 701/14, 99; 345/10, 117

[56] References Cited

U.S. PATENT DOCUMENTS

| | | | |
|---|---|---|---|
| 4,376,934 | 3/1983 | Prohaska et al. | 340/815.76 |
| 4,463,355 | 7/1984 | Schultz et al. | 340/971 |
| 4,777,480 | 10/1988 | Okamoto et al. | 340/688 |
| 5,001,468 | 3/1991 | Brice et al. | 345/50 |
| 5,121,109 | 6/1992 | Murphy, Jr. et al. | 340/688 |
| 5,248,968 | 9/1993 | Kelly et al. | 340/975 |
| 5,412,382 | 5/1995 | Leard et al. | 340/974 |
| 5,416,705 | 5/1995 | Barnett | 701/14 |
| 5,578,985 | 11/1996 | Cremers et al. | 340/461 |
| 5,668,542 | 9/1997 | Wright | 340/971 |
| 5,815,072 | 9/1998 | Yamanaka et al. | 340/461 |

*Primary Examiner*—Benjamin C. Lee

[57] ABSTRACT

Accurate, unambiguous, and space-efficient electronic display techniques are provided for presenting the operator with an indicator whose graphical configuration varies in accordance with whether the relevant control value is within a predetermined tolerance range of a set-point value. More particularly, a control value indicator includes a scale having an axis associated with the control value, a set-point marker placed at a first position along the scale for indicating the set-point value, and a pointer having a second position along the scale for indicating the control value. The pointer and/or the set-point marker exhibit a first graphical configuration corresponding to the case where the control value is not within the predetermined tolerance of the set-point value, and a second graphical configuration corresponding to the case where the control value is within the predetermined tolerance of the set-point value.

4 Claims, 6 Drawing Sheets

First Configuration   Second Configuration

METHODS AND APPARATUS FOR AN IMPROVED CONTROL PARAMETER VALUE INDICATOR

BACKGROUND OF THE INVENTION

1. Field of the Invention

The present invention relates, generally, to electronic instrumentation such as electronic flight control instrumentation and, more particularly, to displays incorporating improved visual cues for indicating to an operator that a manual control input has been set to a desired set-point value within a predetermined tolerance.

2. Description of Related Art

Electronic instrumentation displays continue to advance in sophistication, achieving increasingly higher levels of information density and, consequently, presenting a greater amount of visual information to be perceived and understood by the operator. In many applications, it is critical that visual displays provide a proper cognitive mapping between what the operator is trying to achieve and the information available to accomplish the task. As a result, such systems increasingly utilize human-factor design principles in order to build instrumentation and controls that work cooperatively with human operators.

One area in particular that has experienced an increase in display complexity is the field of electronic flight system instrumentation. Accordingly, the Federal Aviation Administration (FAA) has promulgated a number of standards and advisory circulars relating to flight instrumentation. More particularly, Title 14 of the U.S. Code of Federal Regulations, Federal Aviation Regulations (FAR) Part 25, Sec. 25.1321 et seq. provides guidelines for arrangement and visibility of instruments, warning lights, indicators, and the like. Similarly, detailed guidelines related to electronic displays can be found in FAA Advisory Circular 20-88A, *Guidelines on the Marking of Aircraft Powerplant Instruments* (Sept. 1985).

In general, FAA regulations specify that flight instruments should be grouped together on the instrument panel and centered about the vertical plane of the pilot's forward vision. Furthermore, certain instruments—e.g., required power plant instruments—are to be closely grouped on the instrument panel. As instrument panel space is limited, achieving these goals can be quite difficult for designers faced with presenting a large amount of information within a relatively small space.

As a result of these and other challenges, present-day instrumentation systems are inadequate in many respects. For example, it is often difficult for an operator to judge whether a control input is set to a desired reference value. With continuous control inputs (as opposed to toggled or quantized inputs), this task typically requires the operator to compare the relative alignment of markers on dials or linear gauges. It may be necessary for the operator to adjust the control input such that the parameter value is "close enough" to a reference value within a specified tolerance. For example, an operator may be required to set the throttle input to a specified percentage value within a tolerance of +/−0.5%. Not surprisingly, it is extremely difficult for an operator to make this sort of quantitative judgment from a visual comparison of a pair of gauge markers.

This problem has traditionally been addressed by increasing the size of the display elements such that the elements themselves and the relationships between the elements are easier to perceive by the operator. Increasing the size of display elements, however, has the undesirable effect of reducing the effective information density of the display; that is, as the individual display elements increase in size, the area needed to display the entire instrument panel suffers a similar increase. Thus, the overriding goal of closely positioning the instruments within the operator's field of vision is not well served by increasing the size of individual display elements.

SUMMARY OF THE INVENTION

The present invention provides methods and apparatus for overcoming the limitations of the prior art. In accordance with various aspects of the present invention, an electronic display includes an indicator whose graphical configuration varies in accordance with whether the relevant control value is within a predetermined tolerance range of a set-point value, thus providing the operator with an accurate, unambiguous, and space-efficient display.

In accordance with a preferred embodiment of the present invention, a control value indicator comprises a scale having an axis associated with the control value, a set-point marker placed at a first position along the scale for indicating the set-point value, and a pointer having a second position along the scale for indicating the control value. The pointer and/or the set-point marker exhibit a first graphical configuration corresponding to the case where the control value is not within the predetermined tolerance of the set-point value, and a second graphical configuration corresponding to the case where the control value is within the predetermined tolerance of the set-point value.

BRIEF DESCRIPTION OF THE DRAWING FIGURES

Additional advantages and attributes of the invention will become apparent from the subsequent description and claims, taken in conjunction with the accompanying drawings, wherein like numerals denote like elements, and:

DETAILED DESCRIPTION OF PREFERRED EXEMPLARY EMBODIMENTS

A display in accordance with various aspects of the present invention includes an indicator whose graphical configuration varies in accordance with whether the relevant control value is within a predetermined tolerance range of a set-point value. While many of the embodiments described below are set within the context of commercial flight systems and aviation instrumentation, the present invention may be advantageously employed in any other context where a human operator requires real-time visual feedback relating to a control input. For example, the disclosed methods may be employed for the control of automobiles, helicopters, submarines, and other modes of transportation, as well for the control (e.g., virtual control) of industrial equipment. Thus, the use of flight system examples and an aviation lexicon are not meant as limitations.

Figure 1:
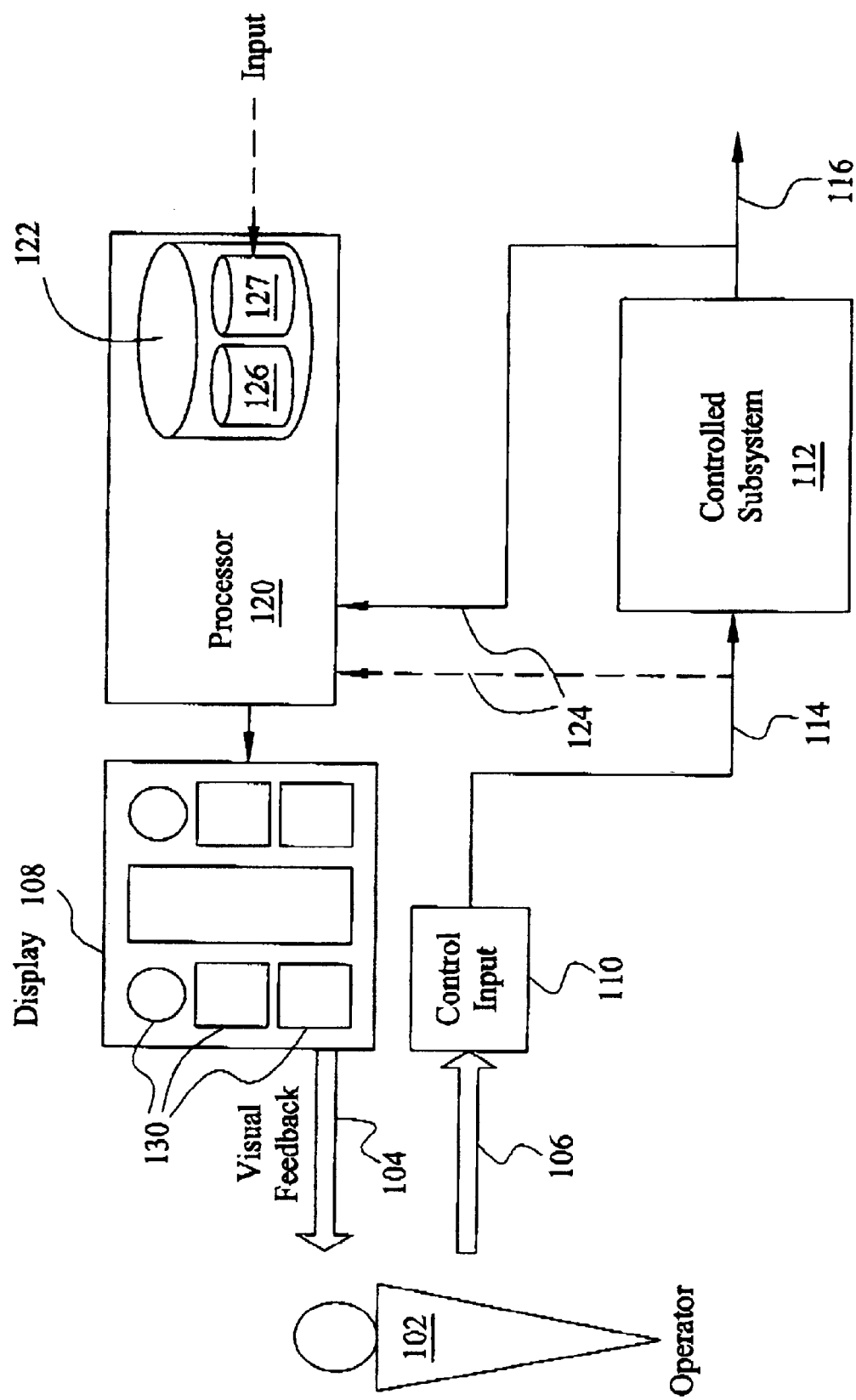
FIG. 1 shows a diagrammatic view of a display system in accordance with the present invention.

Referring now to FIG. 1, a display system illustrative of various aspects of the present invention interfaces with an operator 102 (e.g., a human operator) providing a manual input 106 to a control input apparatus 110 and receiving visual feedback 104 from a display 108 in response to input 106. Control input 110 provides a suitable signal 114 which is received by the controlled subsystem 112, which provides an appropriate output 116 depending on the subsystem's function.

A control parameter value 124 (referred to herein as a "control value") is derived from some input parameter of subsystem 112 and/or some output parameter of subsystem 112, and is communicated to a suitable processor 120, which may also receive control values associated with additional subsystems. Processor 120 is configured to acquire and compare control value 124 to a set of at least one predetermined tolerance value 126 and at least one set-point value 127 corresponding to the parameter associated with control value 124. These tolerance and set-point values 126 and 127 are stored in a suitable storage medium 122 external to or integral with processor 120.

Figures 2A, 2B:
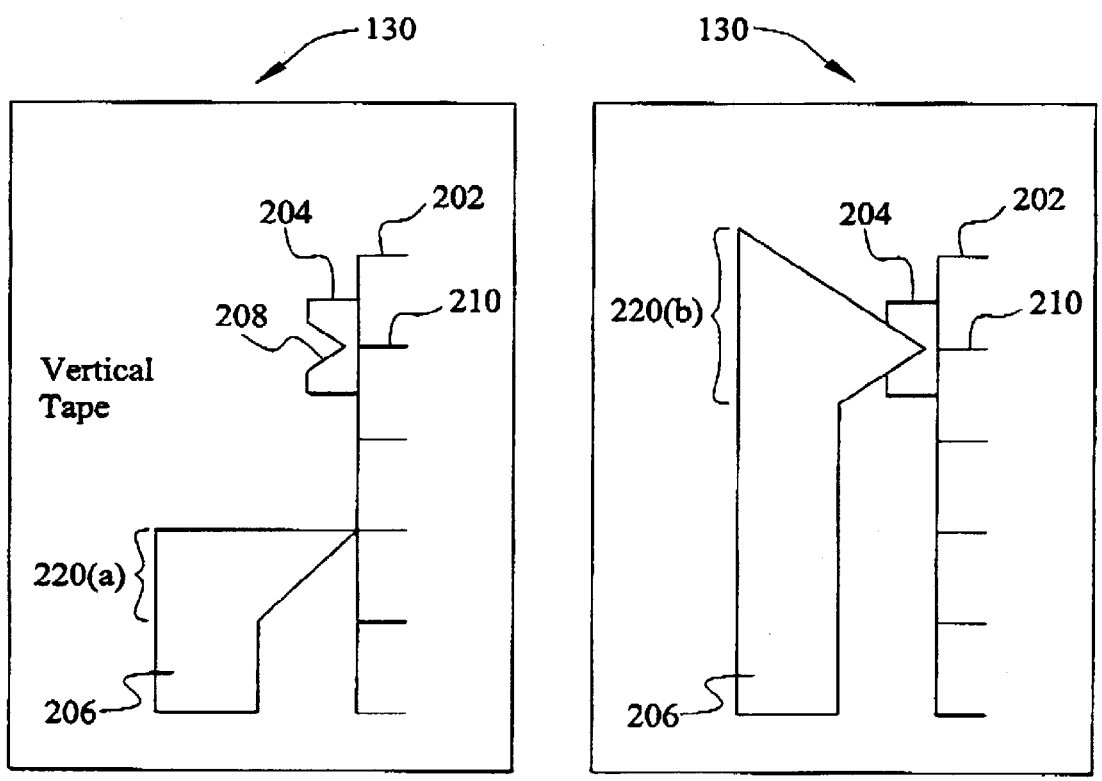
FIG. 2 illustrates an exemplary embodiment of the present invention utilizing a vertical tape display.

Processor 120 communicates with display 108 to present one or more indicators 130 which graphically represents control value 124 using a combination of graphical elements (i.e., pointers, set-point markers, and the like), such that operator 102 may easily discern that control input signal 114 or control value 124 is within a tolerance value 126 of the desired set-point value 127. As described in further detail below, this result is preferably achieved through the use of multiple configurations of indicator graphical elements. For example, with momentary reference to the example shown in FIGS. 2A and 2B, sliding pointer 206 exhibits one configuration (in this case, half of an isosceles triangle 220(a)) when the control value 124 is out of range of a set-point value 210 corresponding to a reference pointer 204 (FIG. 2A) and a second configuration (here, a full isosceles triangle 220(b)) when the control value is suitably close to the set-point value 210 (FIG. 2B).

As mentioned above, operator 102 provides a manual input 106 to control input apparatus 110 to effect a change in subsystem 112. Depending on context, control input apparatus 110 may consist of any suitable actuator for translating manual input 106 into a input signal 114, such as an electrical or mechanical control input signal. In the case of flight cursor control, for example, control input apparatus 110 may comprise a dial, lever, knob, thumb wheel, yoke, side stick controller, or any other suitable input device. Input signal 114 from control input apparatus 110 to subsystem 112, and/or processor 120 may be digital or analog, and may be implemented using any suitable communication media, for example, standard electrical wire, fiber optic cable, wireless channels, and the like. In an alternate embodiment, no control input apparatus 110 is used, and the various control values 124 are derived from other properties, such as altitude or temperature.

Subsystem 112 comprises any various component that operator 102 seeks to control via control input apparatus 110. In the aviation context, for example, subsystem 112 may consist of the engine subsystem, the automatic flight guidance system having several separate input control, parameters, attitude targets, heading targets, attitude targets, or the control surfaces, and the associated actuators. The subsystem 112 is suitably responsive to the control input signal 114 generated by the control input apparatus 110. Accordingly, subsystem 112 generates the appropriate output 116 corresponding to the input signal 114, such as an adjustment of engine thrust or aircraft attitude.

Processor 120 includes suitable hardware, software, firmware, or any combination thereof for acquiring control value 124 and communicating with display 108 in accordance with the relationship between at least one control value 124, at least one tolerance value 126, and at least one set-point value 127. Processor 120 preferably includes an appropriate memory component 122 for storing tolerance value(s) 126 and set point value 127, for example, random access memory (RAM), read-only memory (ROM), electrically-erasable programmable read only memory (EEPROM), flash memory, magnetic or optical storage, and any other suitable memory device. Memory component 122 may be integral with and/or external to processor 120. It should be understood that the present invention may be implemented without a processor by utilizing an electromechanical device.

Processor 120 further includes suitable control logic to process data and communicate with display 108. In this regard, processor 120 may include one or more conventional integrated circuits (ICs) for carrying out these functions, for example, microcontrollers, microprocessors, display drivers, application-specific integrated circuits (ASICs), digital signal processors (DSPs), ROMs, and the like. The processor 120 may operate in conjunction with suitable procedural or non-procedural instruction sets, such as compiled code, assembly code, parallel processing, artificial neural networks, fuzzy logic, or other suitable processing techniques and algorithms.

Control value 124 may correspond to any suitable parameters, including control input signal 114, or the subsystem output 116, or any other appropriate value or set of values. In some cases, it may be appropriate to use multiple processor control values 124, which may be used by processor 120 in raw form or processed according to any appropriate algorithm. Further, the processor control values 124 may be derived from subsystem 112. As illustrated in FIG. 1, or from other characteristics of the system, for example, aircraft altitude, engine temperature, and the like. In an exemplary embodiment, subsystem 112 corresponds to the engine subsystem, processor control value 124 represents the thrust or fan speed parameter in percent, often referred to as "N1" or "EPR".

The set-point value 127 corresponding to a particular subsystem 112 may be derived from a variety of sources. In the aviation context, for example, the set-point may correspond to a known desired value, for example engine thrust percentage necessary to effect take-off, landing, altitude change, or any other flight plan segment. As detailed below, this value is typically entered into a console by the operator or automatically selected by the processor 120 and is thereupon reflected graphically on display 108 by a set-point marker. Similarly, tolerance values 126 may be based on subsystem 120 operational requirements, the particular set-point 127, or any other suitable criteria. The tolerance value 126 provides a range of values which are deemed acceptably near the set-point value 127. For example, in the engine thrust context, it may be desirable that the control value be set within +/−0.5% of set-point 127. The tolerance value 126 need not delimit a symmetrical range centered on set-point 127. Furthermore, the tolerance value 126 may take into account hysteresis effects, so that the tolerance value 126 may vary depending on whether control value 124 is entering or leaving the tolerance range or alternatively, increasing or decreasing. In general, tolerance values 126 may comprise any suitable decision function implemented algorithmically, using simple ranges or look-up tables, or via any other computational means.

Display 108 suitably provides a graphical user interface (GUI) including one or more indicators 130. Display 108 comprises any suitable display media, for example, cathode-ray tube (CRT), light-emitting diode (LED), liquid crystal (LCD), electroluminescent (EL) or light-emitting film (LEF) displays. In a preferred embodiment, display 108 comprises a high-resolution color LCD panel, for example, an LCD display chosen from the Mitsubishi DU 1080 family of flat panel displays. The size of display 108 is preferably chosen in accordance with the number of indicators 130 to be displayed, the overall area viewable by the operator, and any other relevant human-factor considerations. Display 108 may be configured with hardware and/or software to interpret higher level commands from processor 120, such that the graphical driver functionality for driving display 108 may be distributed among various parts of the system.

Indicator 130 provides visual feedback 104 to operator 102 as to the relationship between control value 124, set-point 127, and tolerance values 126. Suitable indicator types include, for example, round-dial, rotating-pointer, vertical scale (e.g., moving tape), horizontal scale, translating pointer, fixed-index, and moving scale indicators. In accordance with the present invention, indicator 130 preferably incorporates two or more configurations for displaying control value information.

Figure 6:
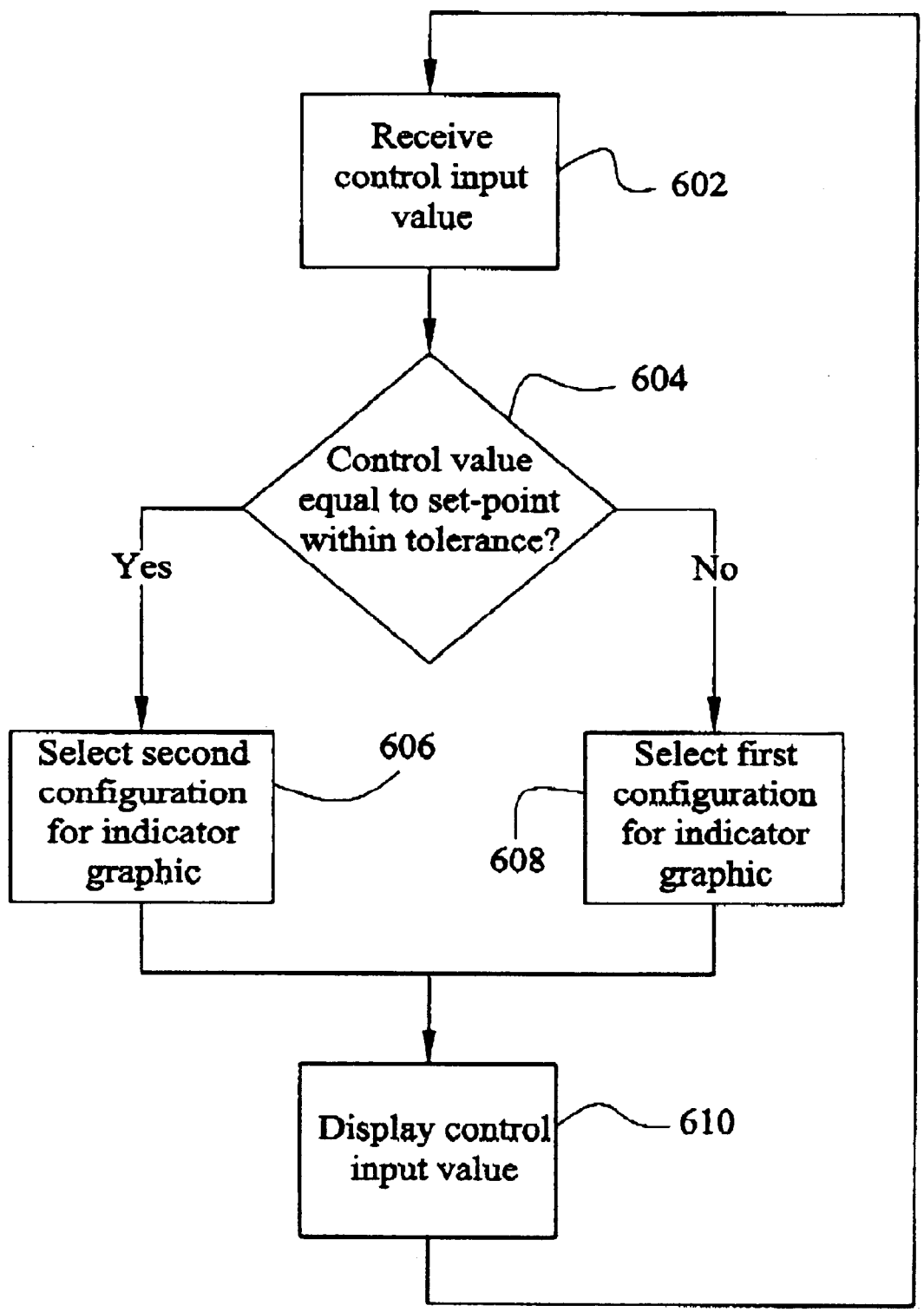
FIG. 6 is a flowchart illustrating an exemplary method of selecting an appropriate graphic indicator configuration.

The general procedure followed by processor 120 is illustrated in FIG. 6. First, the system receives the relevant control value 124 (Step 602). Next, processor 120 compares control value 124 to the set-point value 127 and determines whether it falls within predetermined tolerance 126 (Step 604). If so, the system selects the second configuration for indicator 130 (Step 606); if not, the system selects the first configuration for indicator 130 (Step 608). After choosing the appropriate indicator configuration, processor 120 instructs display 108 to depict control value 124 graphically (Step 610). This process repeats until the control session is complete. It may also be desirable to use more than two configurations for indicator 130 in order to display additional information about subsystem 112.

Figure 5A:
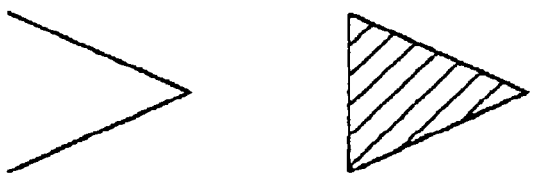
FIG. 5 shows various exemplary pointer configurations in accordance with various aspects of the present invention.
Figure 5B:
Figure 5C:
Figure 5D:
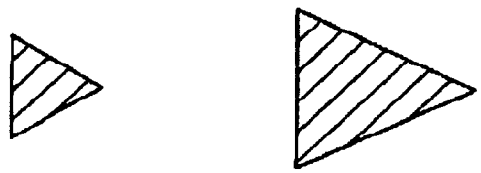
Figure 5E:

Referring now to FIGS. 1, 2A, and 2B, one embodiment of the present invention—the "vertical tape" implementation—comprises a fixed scale 202, a moveable set-point marker (or "reference value marker") 204 having a suitable cut-out pointer shape 208 corresponding to a given set-point value 210. Scale 202 may be linear, logarithmic, piecewise-linear, arbitrary, or non-graduated, depending on context. A moving vertical pointer 206 is used to reflect the control value 124 and exhibits one of two (or more) configurations depending upon whether the control value 124 is outside tolerance values 126 (FIG. 2A), or within tolerance values 126 (FIG. 2B). Specifically, in this embodiment, pointer 206 indicates a value on scale 210 using a half-formed isosceles triangle 220(*a*) in the first case, and a fully-formed isosceles triangle 220(*b*) in the second case. Thus, in addition to the visual cue provided by fitting pointer 206 within reference marker 204, this indicator also provides an unambiguous pointer configuration change that connotes to operator 102 that the control value 124 is close enough to the set-point value 127 within some specified tolerance 126. The specific triangle shapes illustrated in FIGS. 2A and 2B are not intended to be limiting, and that other suitable shapes (e.g., diamonds, ovals, rectangles, and the like) may be employed. In addition, other configuration changes may used for pointer 206. For example, referring momentarily to FIG. 5, pointer 206 may change from an angle shape to a triangle (FIG. 5A), from half a triangle to a full triangle (FIG. 5B), from a short-base triangle to a large-base triangle (FIG. 5C), from a small triangle to a large triangle (FIG. 5D), or from a triangular outline to a filled-in triangle (FIG. 5E). These transitions may also take place in reverse (from right to left rather than left to right as illustrated), and may involve other suitable shapes or colors. As mentioned earlier, display 108 preferably includes a high-resolution color LCD flat panel display. Hence, a variety of colors and weights may be used for the lines and filled regions of indicator 130. In accordance with FAA guidelines, indicator markings should be clearly visible, and the chosen colors should be readily identifiable under all intensity settings and ambient light conditions. In a preferred embodiment, the display background would be black, the scale would be white, the set value would be cyan or white and may have a companion set-pointer shown on the scale with the same color, and the current/actual value indication would be a green moving pointer. However, it should be appreciated that a vast number of variations may be employed utilizing different colors, shapes, and configurations. Depending on the scheme employed, when the pointer reaches the desired range, it changes shape, color, or shape and color.

Figures 3A, 3B:
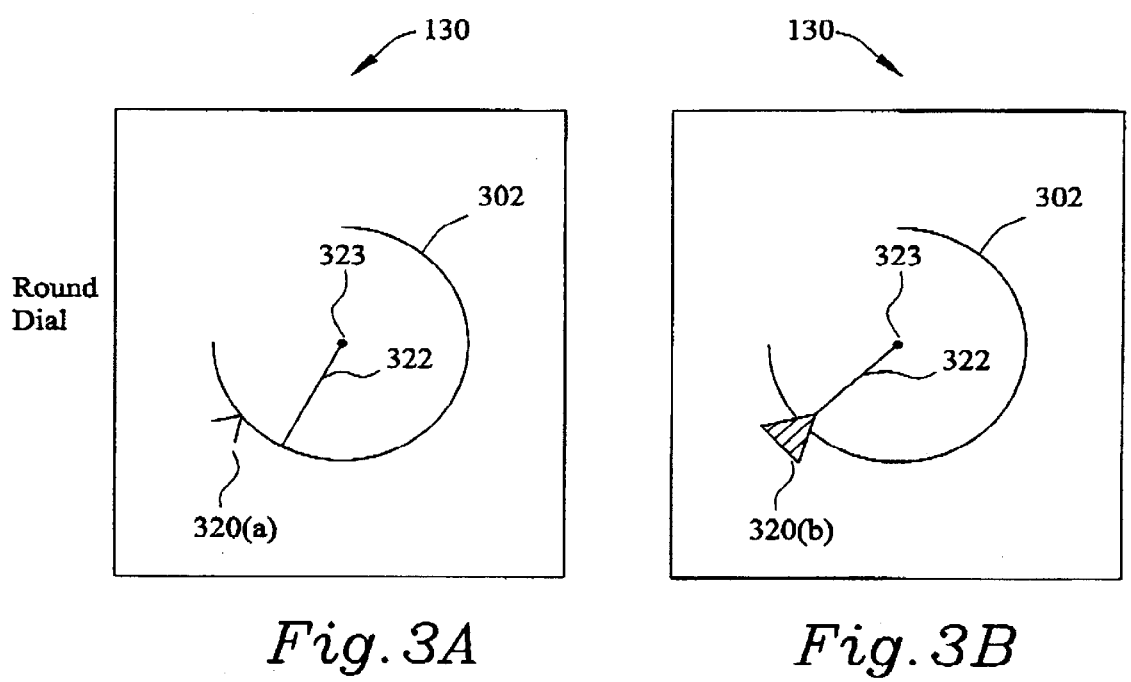
FIG. 3 illustrates an exemplary embodiment of the present invention utilizing a round dial display.

FIGS. 3A and 3B show an alternate embodiment of a display according to various aspects of the present invention, i.e., a "round dial" indicator. In this embodiment, a line pointer 322 rotates about a center point 323 and indicates a control value 124 along the outer perimeter of an arc 302, which may or may not be graduated. A set-point marker (320(*a*) and 320(*b*)) is used to designate a set-point value 127. When the control value 124 is equal to set-point value 127 within a specified tolerance 126, the set-point marker 320(*a*) changes from an angle shape (the first indicator configuration) to a filled-in triangle 320(*b*) (the second indicator configuration). As mentioned above in conjunction with FIG. 5, other transitions of set-point marker 320 may be appropriate.

Figure 4A:
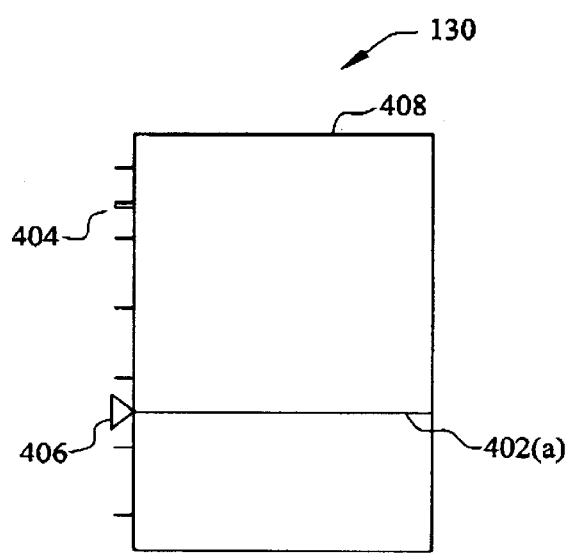
FIG. 4 illustrates an exemplary embodiment of the present invention in the context of a barometer altitude minimum symbology display.
Figure 4B:
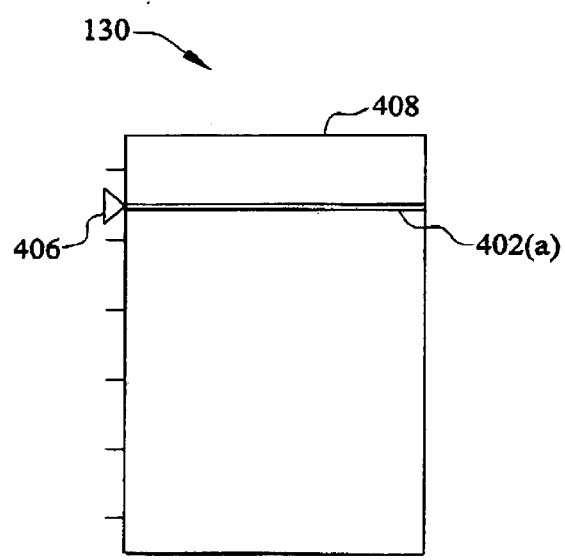

FIGS. 4A and 4B show yet another embodiment of the present invention, depicting an indicator of the type often used to display altitude in an aviation context. Specifically, a pointer 406 and associated line segment 402(*a*) move vertically along a rectangular scale 408 to indicate control value 124. A set-point marker 404 (such as a short line segment) is located along the graduated edge of scale 408 to specify the set-point value 127. When control value 124 is not equal to set-point value 127 within tolerance 126 (FIG. 4A), the displayed thickness of set-point marker 404 is significantly greater than that of line segment 402(*a*) (first configuration). When control value 124 equals set-point value 127 within tolerance 126, the thickness of line segment 402 increases to match that of set-point marker 404. As an additional visual cue, pointer 406 may exhibit any of the triangular transformations described above.

In summary, the present invention provides an improved electronic display indicator which includes an indicator whose graphical configuration varies in accordance with whether the relevant control value is within a predetermined tolerance range of a set-point value, thus providing the operator with an accurate, unambiguous, and space-efficient display.

Although the invention has been described herein in conjunction with the appended drawings, those skilled in the art will appreciate that the scope of the invention is not so limited. For example, it will be appreciated that the embodiments illustrated above present a relatively small subset of display types and configurations that would profit from the disclosed techniques. Other geometries, colors, and configurations may be employed for the various set-point markers, scales, and pointers used for the indicator. These and other modifications in the selection, design, and arrangement of the various components and steps discussed herein may be made without departing from the scope of the invention as set forth in the appended claims.

What is claimed is:

1. A control value indicator for indicating whether a control value is set within a predetermined tolerance of a set-point value marked by a set-point marker on a scale having a pointer, said control value indicator being in the form of one of said set-point marker and said pointer and having a first graphical configuration corresponding to the case where said control value is not within said predetermined tolerance of said set-point value, and a second graphical configuration corresponding to the case where said control value is within said predetermined tolerance of said set-point value.

2. The control value indicator of claim 1, wherein:

said scale has an axis associated with said control value;

said set-point marker is placed at a first position along said scale for indicating said set-point value; and said pointer has a second position along said scale for indicating said control value, wherein said pointer in said first graphical configuration comprises a first pointer shape, and said pointer in said second graphical configuration comprises a second pointer shape.

3. The control value indicator of claim 1, wherein:

said scale has an axis associated with said control value;

said set-point marker is placed at a first position along said scale for indicating said set-point value, wherein said set-point marker in said first graphical configuration comprises a first set-point marker shape, and said set-point marker in said second graphical configuration comprises a set-point marker having a second set-point marker shape; and said pointer having a second position along said scale for indicating said control value.

4. An electronic display system for providing visual feedback to an operator, said system comprising:

a display for displaying a control value indicator, in the form of one of a set-point marker and a pointer, viewable by said operator;

a control input for receiving manual input from said operator;

a controlled subsystem for receiving an input from said control input and producing an output;

a processor having memory means associated therewith for storing a set-point value, marked by said set-point marker on a scale having said pointer, and tolerance information, said processor further configured to receive a control value based upon a parameter of said controlled subsystem, compare said control value to said set-point value and said tolerance information, and to communicate with said display to display said control value indicator;

said control value indicator having at least two graphical configurations based on said control value, said set-point value, and said tolerance information.

* * * * *